US006969798B2

(12) United States Patent
Iwase

(10) Patent No.: US 6,969,798 B2
(45) Date of Patent: Nov. 29, 2005

(54) APPARATUS, METHOD AND COMPUTER PROGRAM FOR IMPARTING TONE EFFECTS TO MUSICAL TONE SIGNALS

(75) Inventor: Hiroyuki Iwase, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 219 days.

(21) Appl. No.: 10/360,077

(22) Filed: Feb. 6, 2003

(65) Prior Publication Data

US 2003/0145713 A1 Aug. 7, 2003

(30) Foreign Application Priority Data

Feb. 7, 2002 (JP) ............................ 2002-031044

(51) Int. Cl.[7] ............................ G01P 3/00; G10H 1/02; G10H 7/00

(52) U.S. Cl. ............................ 84/626; 84/622; 84/659; 84/662

(58) Field of Search .................. 84/600, 615, 622–633, 84/653, 659–665; 381/61–65

(56) References Cited

U.S. PATENT DOCUMENTS 4,628,789 A * 12/1986 Fujimori ...................... 84/626
5,750,914 A 5/1998 Takahashi
6,091,012 A * 7/2000 Takahashi .................... 84/626

* cited by examiner

*Primary Examiner*—Marlon T. Fletcher
(74) *Attorney, Agent, or Firm*—Morrison & Foerster LLP

(57) ABSTRACT

A music performance data signal contains tone effect control messages to control the tone signal processor for imparting tone effects to the produced musical tones in a high-ranked model of tone producing apparatus in which many and complicated tone effects are available. In order that such a music performance signal can drive a low-ranked model of tone producing apparatus in which a small number of and simple tone effect are available, the tone effect control messages for the high-ranked model are converted to tone effect control messages which can realize similar tone effects as on the high-ranked model. For the tone effects not directly available in the low-ranked model, the tone effect control messages are converted with reference to conversion tables.

16 Claims, 14 Drawing Sheets

*Fig.1* Assigned Effect List

| TYPEMSB | | Effects | |
|---|---|---|---|
| DEC | HEX | TYPELSB = 00 | |
| | | On High-End Model | On Example of Invention |
| 64 | 40 | NO EFFECT or THRU | NO EFFECT or THRU |
| 65 | 41 | CHORUS 1 | CHORUS 1 |
| 66 | 42 | CELESTE 1 | CELESTE 1 |
| 69 | 45 | ROTARY SPEAKER | ROTARY SPEAKER |
| 70 | 46 | TREMOLO | TREMOLO |
| 73 | 49 | DISTORTION | DISTORTION |
| 77 | 4D | 2-BAND EQ | 2-BAND EQ |
| 78 | 4E | AUTO WAH | AUTO WAH |
| 81 | 51 | HARMONIC ENHANCER | NO EFFECT or THRU |
| 82 | 52 | TOUCH WAH 1 | AUTO WAH (4E) |
| 83 | 53 | COMPRESSOR | NO EFFECT or THRU |
| 86 | 56 | 2WAY ROTARY SPEAKER | ROTARY SPEAKER (45) |
| 87 | 57 | ENSEMBLE DETUNE | NO EFFECT or THRU |
| 98 | 62 | V DISTORATION HARD | DISTORATION (49) |
| 99 | 63 | DUAL ROTOR SPEAKER1 | ROTARY SPEAKER (45) |

*Fig.2* Hardware Configuration
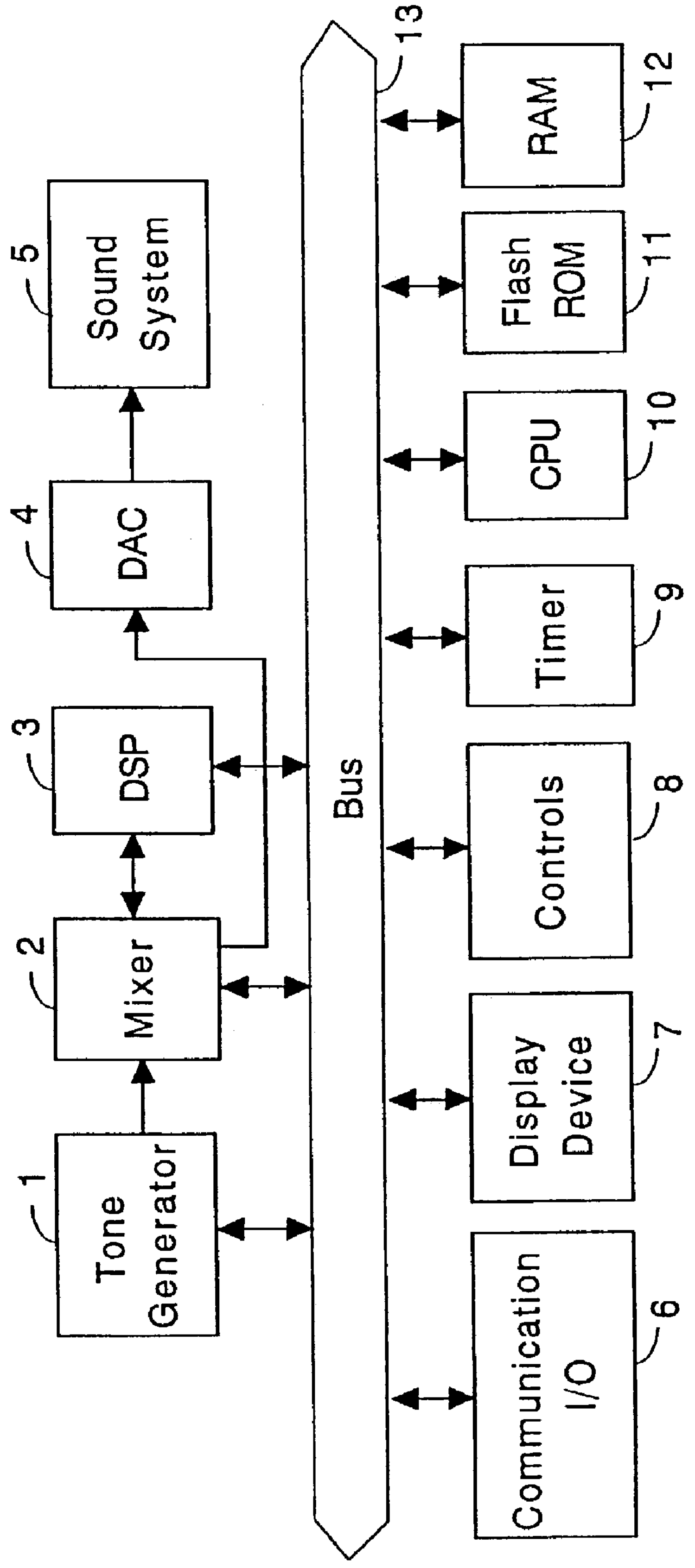

*Fig.3* Assigned Effect List on High-End Model

| TYPEMSB | | TYPELSB | | |
|---|---|---|---|---|
| DEC | HEX | 00 | 01 | 02 |
| 64 | 40 | NO EFFECT or THRU | | |
| 65 | 41 | CHORUS 1 | CHORUS 2 | CHORUS 3 |
| 66 | 42 | CELESTE 1 | CELESTE 2 | CELESTE 3 |
| 69 | 45 | ROTARY SPEAKER | DIST+ROTARY SPEAKER | OVERDRIVE+ROTARY SPEAKER |
| 70 | 46 | TREMOLO | | |
| 73 | 49 | DISTORTION | COMP+DISTORTION | |
| 77 | 4D | 2-BAND EQ | | |
| 78 | 4E | AUTO WAH | AUTO WAH+DIST | AUTO WAH+OVERDRIVE |
| 81 | 51 | HARMONIC ENHANCER | | |
| 82 | 52 | TOUCH WAH 1 | TOUCH WAH+DIST | TOUCH WAH+OVERDRIVE |
| 83 | 53 | COMPRESSOR | | |
| 86 | 56 | 2WAY ROTARY SPEAKER | DIST+2WAY ROTARY SPEAKER | OVERDRIVE+2WAY ROTARY SPEAKER |
| 87 | 57 | ENSEMBLE DETUNE | | |
| 98 | 62 | V DISTORATION HARD | V DISTORATION HARD+DELAY | V DISTORATION SOFT |
| 99 | 63 | DUAL ROTOR SPEAKER1 | ROTARY SPEAKER2 | |

(blank box) Describes Assigned Effect (shaded box) Means Same as Fundamental (00) Assignment

*Fig.4* Assigned Effect List on Conventional Low-Priced Model

| TYPEMSB | | TYPELSB | | |
|---|---|---|---|---|
| DEC | HEX | 00 | 01 | 02 |
| 64 | 40 | NO EFFECT or THRU | | |
| 65 | 41 | CHORUS 1 | CHORUS 2 | CHORUS 3 |
| 66 | 42 | CELESTE 1 | CELESTE 2 | CELESTE 3 |
| 69 | 45 | ROTARY SPEAKER | | |
| 70 | 46 | TREMOLO | | |
| 73 | 49 | DISTORTION | | |
| 77 | 4D | 2-BAND EQ | | |
| 78 | 4E | AUTO WAH | | |
| 81 | 51 | (NO EFFECT or THRU) | | |
| 82 | 52 | (NO EFFECT or THRU) | | |
| 83 | 53 | (NO EFFECT or THRU) | | |
| 86 | 56 | (NO EFFECT or THRU) | | |
| 87 | 57 | (NO EFFECT or THRU) | | |
| 98 | 62 | (NO EFFECT or THRU) | | |
| 99 | 63 | (NO EFFECT or THRU) | | |

[white box] Describes Assigned Effect

[shaded box] Means Same as Fundamental (00) Assignment

*Fig.5* Assigned Effect List on Low-Priced Model of Invention

| TYPEMSB | | TYPELSB | | |
|---|---|---|---|---|
| DEC | HEX | 00 | 01 | 02 |
| 64 | 40 | NO EFFECT or THRU | | |
| 65 | 41 | CHORUS 1 | CHORUS 2 | CHORUS 3 |
| 66 | 42 | CELESTE 1 | CELESTE 2 | CELESTE 3 |
| 69 | 45 | ROTARY SPEAKER | | |
| 70 | 46 | TREMOLO | | |
| 73 | 49 | DISTORTION | | |
| 77 | 4D | 2-BAND EQ | | |
| 78 | 4E | AUTO WAH | | |
| 81 | 51 | (NO EFFECT or THRU) | | |
| 82 | 52 | AUTO WAH | | |
| 83 | 53 | (NO EFFECT or THRU) | | |
| 86 | 56 | ROTARY SPEAKER | | |
| 87 | 57 | (NO EFFECT or THRU) | | |
| 98 | 62 | DISTORTION | | |
| 99 | 63 | ROTARY SPEAKER | | |

[white box] Describes Assigned Effect

[shaded box] Means Same as Fundamental (00) Assignment

*Fig.6* Parameters

AUTO WAH (TYPEMSB=4EH, TYPELSB=00H)

| No. | Parameter Name | Display | Value | See Table |
|---|---|---|---|---|
| 1 | LFO Frequency | 0.0 ~ 39.7 [Hz] | 0 - 127 | table#1 |
| 2 | LFO Depth | 0 ~ 127 | 0 - 127 | |
| 3 | Cutoff Frequency Offset | 0 ~ 127 | 0 - 127 | |
| 4 | Resonance | 1.0 ~ 12.0 | 10 - 120 | |
| 5 | | | | |
| 6 | EQ Low Frequency | 32 ~ 2.0 k[Hz] | 4 - 40 | table#3 |
| 7 | EQ Low Gain | −12 ~ +12 [dB] | 52 - 76 | |
| 8 | EQ High Frequency | 500 ~ 16.0 k[Hz] | 28 - 58 | table#3 |
| 9 | EQ High Gain | −12 ~ +12 [dB] | 52 - 76 | |
| 10 | Dry/Wet Balance | D63>W ~ D=W ~D<W63 | 1 - 127 | |
| 11 | Drive | 0 ~ 127 | 0 - 127 | |
| 12 | | | | |
| 13 | | | | |
| 14 | | | | |
| 15 | | | | |
| 16 | | | | |

*Fig.7* Parameters

AUTO WAH+DIST (TYPEMSB=4EH, TYPELSB=01H)
AUTO WAH+ODRV (TYPEMSB=4EH, TYPELSB=02H)

| No. | Parameter Name | Display | Value | See Table |
|---|---|---|---|---|
| 1 | LFO Frequency | 0.0 ~ 39.7 [Hz] | 0 - 127 | table#1 |
| 2 | LFO Depth | 0 ~ 127 | 0 - 127 | |
| 3 | Cutoff Frequency Offset | 0 ~ 127 | 0 - 127 | |
| 4 | Resonance | 1.0 ~ 12.0 | 10 - 120 | |
| 5 | | | | |
| 6 | EQ Low Frequency | 32 ~ 2.0 k[Hz] | 4 - 40 | table#3 |
| 7 | EQ Low Gain | −12 ~ +12 [dB] | 52 - 76 | |
| 8 | EQ High Frequency | 500 ~ 16.0 k[Hz] | 28 - 58 | table#3 |
| 9 | EQ High Gain | −12 ~ +12 [dB] | 52 - 76 | |
| 10 | Dry/Wet Balance | D63>W ~ D=W ~D<W63 | 1 - 127 | |
| 11 | Drive | 0 ~ 127 | 0 - 127 | |
| 12 | EQ Low Gain(distortion) | −12 ~ +12 [dB] | 52 - 76 | |
| 13 | EQ Mid Gain(distortion) | −12 ~ +12 [dB] | 52 - 76 | |
| 14 | LPF Cutoff | 1.0k [Hz] ~ thru | 34 - 60 | table#3 |
| 15 | Output Level | 0 ~ 127 | 0 - 127 | |
| 16 | | | | |

*Fig.8* Parameters

2WAY ROTARY SPEAKER

| No. | Parameter Name | Data Range | |
|---|---|---|---|
| | | | Display |
| 1 | Rotor Speed | 0 – 127 | 0.0 ~ 39.7 [Hz] |
| 2 | Drive Low | 0 – 127 | 0 ~ 127 |
| 3 | Drive High | 0 – 127 | 0 ~ 127 |
| 4 | Low/High Balance | 1 – 127 | L63>H ~ L=H ~L<H63 |
| 5 | | 0 | |
| 6 | EQ Low Frequency | 4 – 40 | 32 ~ 2.0k [Hz] |
| 7 | EQ Low Gain | 52 – 76 | −12 ~ +12 [dB] |
| 8 | EQ High Frequency | 28 – 58 | 500 ~ 16.0k [Hz] |
| 9 | EQ High Gain | 52 – 76 | −12 ~ +12 [dB] |
| 10 | | 127 | |
| 11 | Crossover Frequency | 14 – 54 | 100 ~ 10.0k [Hz] |
| 12 | Mic L-R Angle | 0 – 60 | 0 ~ 180 [deg] |
| 13 | | 0 | |
| 14 | | 0 | |
| 15 | | 0 | |
| 16 | | 0 | |

*Fig.9* Parameters

ROTARY SPEAKER

| No. | Parameter Name | Data Range | |
|---|---|---|---|
| | | | Display |
| 1 | LFO Frequency | 0 – 127 | 0.00~ 39.7 [Hz] |
| 2 | LFO Depth | 0 – 127 | 0 ~ 127 |
| 3 | – | 0 | – |
| 4 | – | 0 | – |
| 5 | – | 0 | – |
| 6 | EQ Low Frequency | 4 – 40 | 32 ~ 2.0k [Hz] |
| 7 | EQ Low Gain | 52 – 76 | −12 ~ +12 [dB] |
| 8 | EQ High Frequency | 28 – 58 | 500 ~ 16.0k [Hz] |
| 9 | EQ High Gain | 52 – 76 | −12 ~ +12 [dB] |
| 10 | Dry/Wet Balance | 1 – 127 | D63>W ~ D=W ~D<W63 |
| 11 | EQ Mid Frequency | 14 – 54 | 100 ~ 10.0k [Hz] |
| 12 | EQ Mid Gain | 52 – 76 | −12 ~ +12 [dB] |
| 13 | EQ Mid Width | 10 – 127 | 1.0 ~ +12.0 |
| 14 | – | 0 | – |
| 15 | – | 0 | – |
| 16 | – | 0 | – |

*Fig.10* Parameters

ROTARY SPEAKER

| No. | Parameter Name | Data Range | |
|---|---|---|---|
| | | | Display |
| 1 | LFO Frequency | 0 – 127 | 0.00~ 39.7 [Hz] |
| 2 | | 0 | |
| 3 | | 0 | |
| 4 | | 0 | |
| 5 | | 0 | |
| 6 | EQ Low Frequency | 4 – 40 | 32 ~ 2.0k [Hz] |
| 7 | EQ Low Gain | 52 – 76 | −12 ~ +12 [dB] |
| 8 | EQ High Frequency | 28 – 58 | 500 ~ 16.0k [Hz] |
| 9 | EQ High Gain | 52 – 76 | −12 ~ +12 [dB] |
| 10 | | 0 | |
| 11 | | 0 | |
| 12 | | 0 | |
| 13 | | 0 | |
| 14 | | 0 | |
| 15 | | 0 | |
| 16 | | 0 | |

*Fig.11a* Effect Code Conversion Table

| TYPEMSB | | TYPELSB | | |
|---|---|---|---|---|
| DEC | HEX | 00 | 01 | 02 |
| 64 | 40 | 00 | 00 | 00 |
| 65 | 41 | 00 | CHORUS 2 | CHORUS 3 |
| 66 | 42 | 00 | CELESTE 2 | CELESTE 3 |
| 69 | 45 | 00 | 00 | 00 |
| 70 | 46 | 00 | 00 | 00 |
| 73 | 49 | 00 | 00 | 00 |
| 77 | 4D | 00 | 00 | 00 |
| 78 | 4E | 00 | 00 | 00 |
| 81 | 51 | (FF) | FF | FF |
| 82 | 52 | FE | FE | FE |
| 83 | 53 | (FF) | FF | FF |
| 86 | 56 | FE | FE | FE |
| 87 | 57 | (FF) | FF | FF |
| 98 | 62 | FE | FE | FE |
| 99 | 63 | FE | FE | FE |

*Fig.11b* Effect Category Conversion Table

| TYPEMSB | | CONVMSB |
|---|---|---|
| DEC | HEX | HEX |
| 82 | 52 | 4E |
| 86 | 56 | 45 |
| 98 | 62 | 49 |
| 99 | 63 | 45 |

Fig.12a Effect Selection Processing (Part 1)
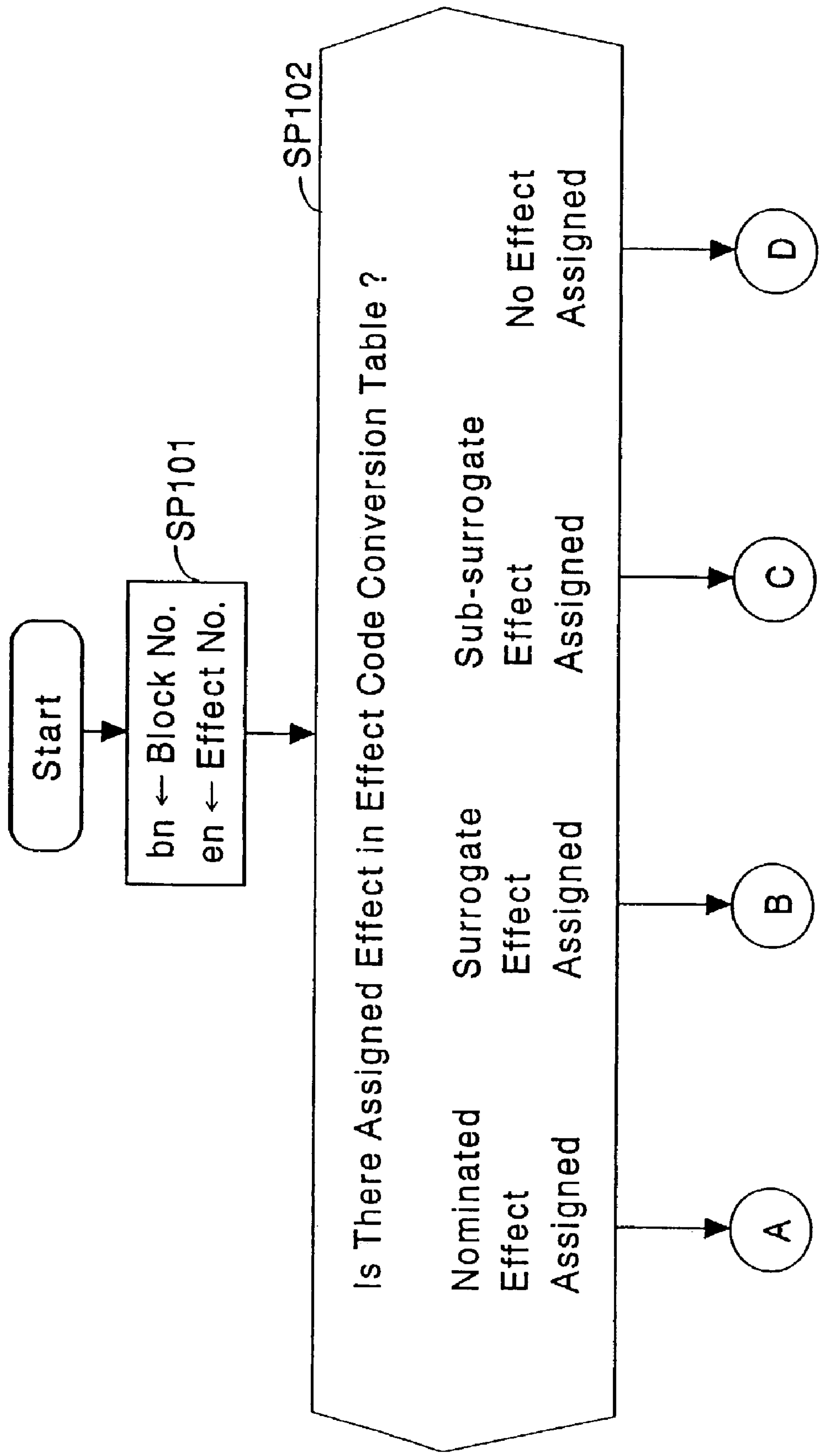

*Fig. 12b* Effect Selection Processing (Part 2)
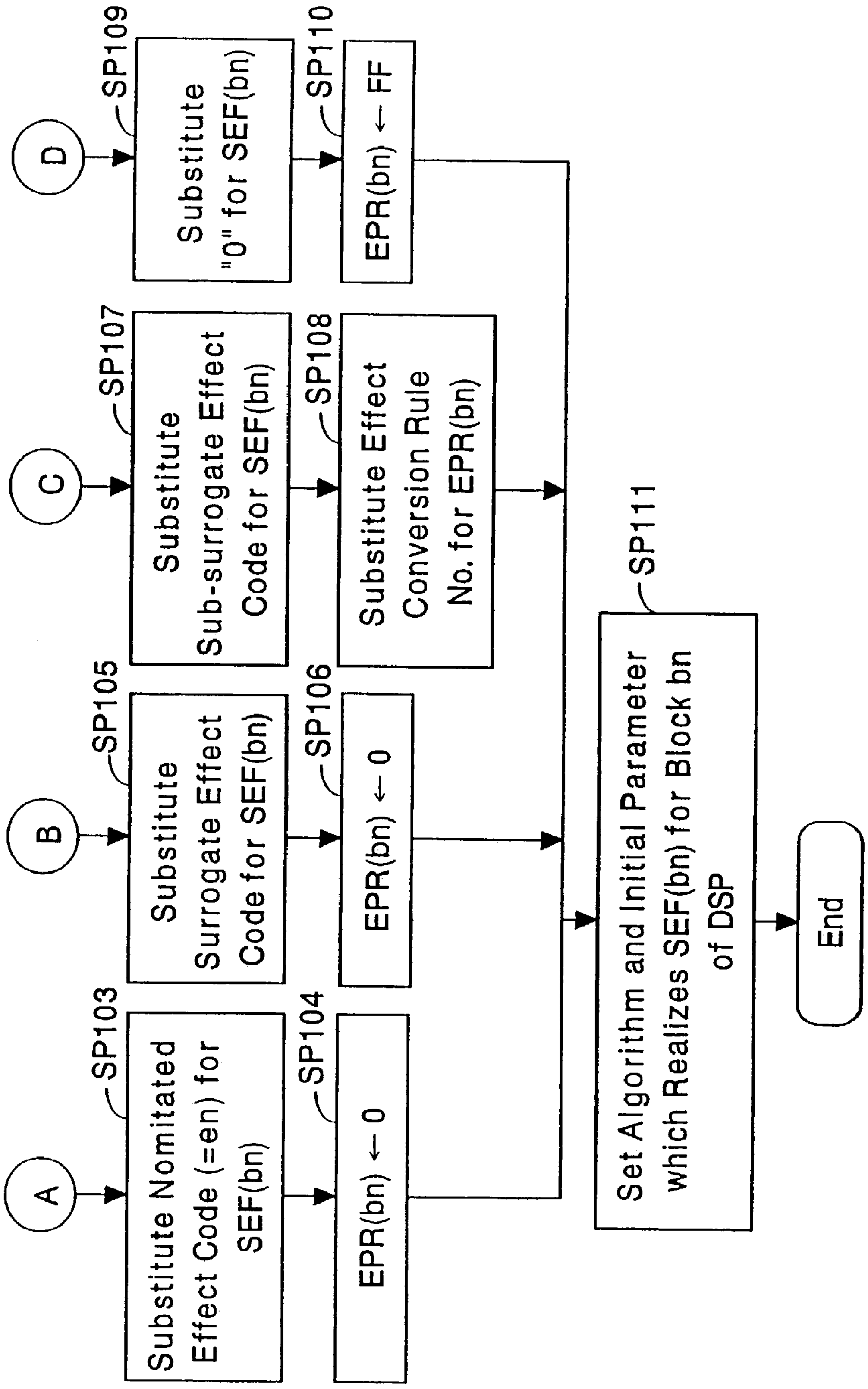

*Fig. 13* Parameter Conversion Processing
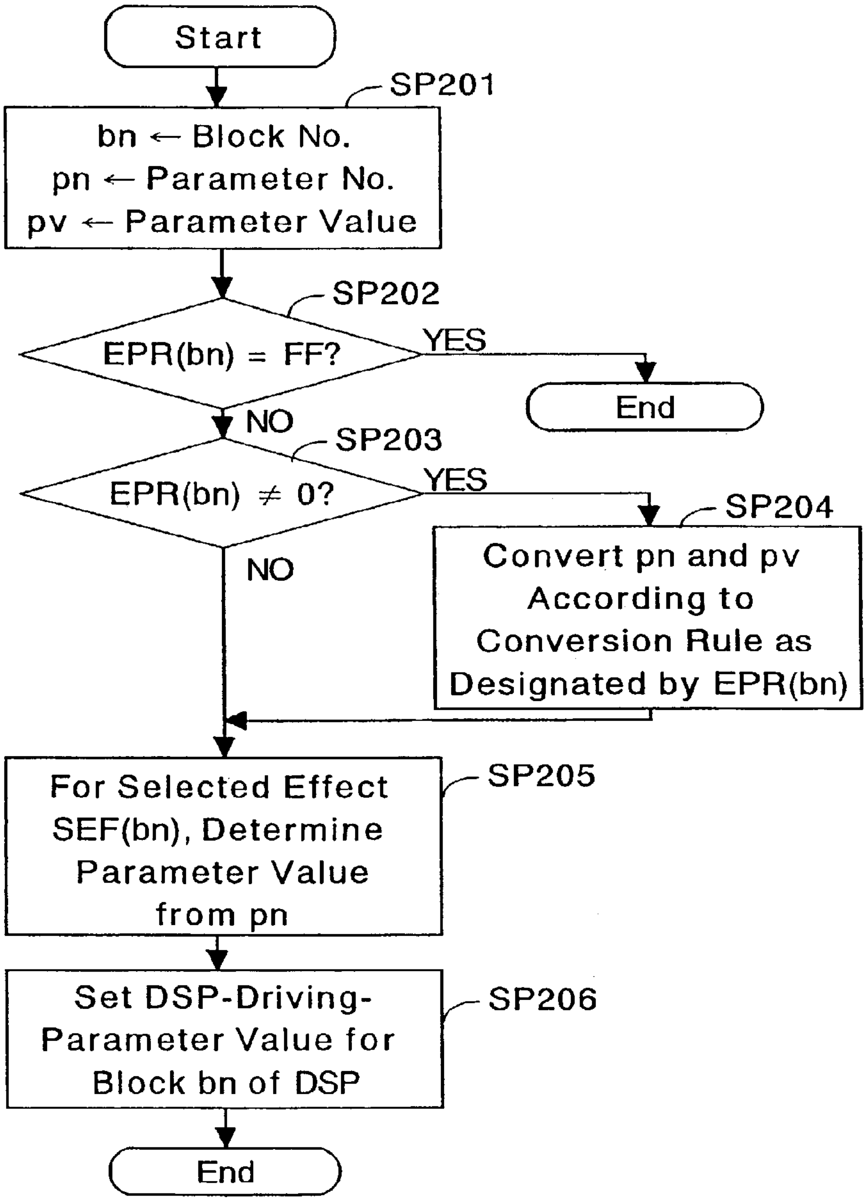

APPARATUS, METHOD AND COMPUTER PROGRAM FOR IMPARTING TONE EFFECTS TO MUSICAL TONE SIGNALS

BACKGROUND OF THE INVENTION

1. Field of the Invention

The present invention relates to a musical apparatus and a method for imparting tone effects to the musical tones which are produced based on the music performance data signals including tone effect control data, and a computer program for realizing such an apparatus and a method using a computer system, and more particularly to an apparatus and a method in which some tone effect control data to determine tone effects which are equipped or provided in a musical apparatus of a complicated model and not in a musical apparatus of a simplified model may be utilized via conversion to provide similar surrogate tone effects in such a musical apparatus of a simplified model.

2. Description of the Prior Art

In the field of electronic musical tone producing apparatuses, tone properties such as tone pitches, tone colors and tone effects of the tones to be produced are controlled or determined by music performance data signals, generally, under the MIDI protocol. In the MIDI protocol, however, the controls of the tone effects are not defined universally in the basic MIDI format, and consequently, such control data or messages are defined locally or individually according to the respective manufactures' definitions in the data clauses prepared as the exclusive messages. There are various ranks of tone producing apparatuses under the MIDI protocol, from a low-end model incorporating a few kinds of tone effects to a high-end model incorporating many kinds of tone effects in view of the grade of tone effects. Accordingly, the MIDI control data, i.e. MIDI messages may not necessarily be compatible among different ranks of tone producing apparatuses, or among apparatuses manufactured by different manufactures even of a similar rank, or among apparatuses manufactured in different years or in different specifications even by the same manufacture. Thus, the same MIDI performance data string may not necessarily give an identical music performance with the identical tone effects.

In order to solve such disadvantages, an idea is proposed and disclosed in the specification of a published Japanese patent application under the unexamined publication No. H8-87270, wherein the music performance data on the tone pitches, the tone colors and the tone effects as prepared for a higher-rank model are converted into the data for the tone effects which are available for the tone production on a lower-rank model. In other words, on a lower-rank model not incorporating some particular tone effects which are equipped in a high-rank model, such particular tone effects are surrogated by similar tone effects available in the lower-rank model.

In the above referenced idea, the system exclusive message codes or the like are used to designate the intended tone effects. The system exclusive message code includes and effect selection code for designating a category or type of effect, and effect control parameter code for designating a parameter to be controlled, and effect parameter value determining data for determining the value of the designated parameter, thereby controlling a specific operation of the tone effect imparting algorithm to realize an intended tone effect in the digital signal processor. In the standard MIDI protocol, the effect category is represented by two bytes of data, in which the most significant byte (MSB) represents a rough effect category (hereinafter referred to as TYPEMSB in the list) and the least significant byte (LSB) represents a precise effect category or effect variation (hereinafter referred to as TYPELSB in the list). The effect variations which are assigned to the TYPELSB code of "00H" for the respective rough categories are referred to as "fundamental effects." The alphanumeric notation ended with a character "H" such as "00H" and "FFH" represent numeral values in hexadecimal notation. For each specific effect as assigned to each effect variation (including fundamental), there are sixteen parameter items numbered from "1" through "16" and constituting a set of sixteen parameter values (represented by 16-byte data in total), although some may be absent depending on the tone effects. The contents of the sixteen parameter items as well as the sixteen parameter values are not necessarily the same for all the effect categories, but may be different from one category to another.

The effects can be listed in an assigned effect list described in a matrix form placing the MSBs (rough categories) vertically to define rows and the LSBs (variations) horizontally to define columns. FIG. 3 is an assigned effect list describing the assigned effects on a high-end model in detail including variation effects, while FIG. 4 is an assigned effect list describing the assigned effects on a conventional low-priced model in detail including variation effects. Whereas a high-end model has effects assigned to the TYPEMSB code "51H" and above, a low-priced model does not have effects assigned to such a range of TYPEMSB codes. Among variations for the same rough category, the variation effects are controlled by using effect control parameters which are compatible with the fundamental effect. For example, effect control parameters for the rough category of TYPEMSB=4EH, are shown in FIGS. 6 and 7, respectively, in which FIG. 6 describes the effect control parameters for the "AUTO WAH" effect under TYPELSB=00H, and FIG. 7 describes the effect control parameters for the "AUTO WAH+DISTORTION" effect under TYPELSB=01H and those for the "AUTO WAH+OVERDRIVE" effect under, TYPELSB=02H.

FIGS. 6 and 7 describe, from left column to right, parameter Nos., parameter names, displayed value ranges, parameter value ranges, etc. The parameters for "AUTO WAH" effect are "LFO Frequency," "LFO Depth," "Cutoff Frequency Offset," "Resonance," "EQ Low Frequency," "EQ Low Gain," "EQ High Frequency," "EQ High Gain," "Dry/Wet Balance" and "Drive." The parameters for "AUTO WAH+DISTORTION" and for "AUTO WAH+OVERDRIVE" are the same as those for the above-mentioned "AUTO WAH" plus "EQ Low Gain (distortion)," "EQ Mid Gain (distortion)," "LPF Cutoff" and "Output Level." Under such provision of the parameters, therefore, an apparatus not equipped with "AUTO WAH+DISTORTION" effect or "AUTO WAH+OVERDRIVE" effect can produce musical tones with similar tone effects by surrogating (i.e. utilizing) the fundamental effect "AUTO WAH" for (i.e. in place of) such a variation effect, thereby providing better reproduceability of the music performance than the case employing no such absent (non-equipped) effects.

Among various kinds of models, different effects are equipped on different models, and some model may be equipped with no effects assigned to particular categories. For example, comparing FIG. 3 and FIG. 4, it will be understood that where a music performance data string composed for the high-end model (FIG. 4) and having effect control data for "2WAY ROTARY SPEAKER" effect of TYPEMSB=56H is played back on the low-priced model (FIG. 3), the produced tones of the played-back music performance carry no effect, as no effect is assigned at the effect code of TYPEMSB=56H, which frame says "(NO EFFECT OR THRU)." Likewise at the effect codes of TYPEMSB=51H, 52H, 53H, 57H, 62H and 63H, no effects are imparted to the tones produced on the low-priced model. In the assigned effect lists, the effect code frame having a description of "NO EFFECT OR THRU" means that there is no effect assigned to the frame, and the effect code frame under TYPELSB=01H and TYPELSB=02H column marked with shading means the same effect as the fundamental effect under TYPELSB=00H is assigned to the frame, i.e. the effect for the frame "01H" and the frame "02H" is substituted by the effect for the frame "00H." The "ROTARY SPEAKER" effect is an electronic simulation of a mechanical rotary speaker of which the rotating speed is controllable. The "2WAY ROTARY SPEAKER" effect is an electronic simulation of two mechanical rotary speakers arranged in parallel.

However, even in the case where the music performance data string includes rough category effect codes for which no effects are assigned on the low-priced model, it will be preferable to utilize some surrogate similar effects assigned to other rough category effect codes. For example, the "2WAY ROTARY SPEAKER" effect at TYPEMSB=56H in FIG. 3 may be substituted (surrogated) by the "ROTARY SPEAKER" effect at TYPEMSB=45H. Similarly, the effects at TYPEMSB=52H, 62H and 63H may preferably be surrogated by other similar effects (such as "AUTO WAH," "DISTORTION" and "ROTARY SPEAKER"), respectively. In this connection, where effects can be surrogated by other effects beyond categories on a low-priced model, it may be considered that an assigned effect list as shown in FIG. 5 is applicable.

But as a matter of fact, however, the effect control parameters for such a surrogate effect are not the same as the effect control parameters for the original effect, and the surrogation is not necessarily possible. FIGS. 8 and 9 explains such situations with respect to the "2WAY ROTARY SPEAKER" effect and the "ROTARY SPEAKER" effect, showing the assigned effect control parameters to the respective parameter Nos. 1 through 16. Each of the lists indicates, from left to right, the parameter Nos., the parameter names and the ranges of the respective parameter values. The "2WAY ROTARY SPEAKER" effect of FIG. 8 contains parameters "Rotor Speed," "Drive Low," "Drive High," "Low/High Balance" and so forth, while the "ROTARY SPEAKER" effect of FIG. 9 contains parameters "LFO Frequency," "LFO Depth" and so forth. Thus, if the "ROTARY SPEAKER" effect is set as a surrogate for the "2WAY ROTARY SPEAKER" effect, the parameter No. "2" designates the "LFO Depth" parameter in place of the "Drive Low" parameter, and accordingly the parameter values for the parameter item of "Drive Low" will determine the parameter value for the parameter item of "LFO Depth," and consequently an effect which is not intended by the user will be imparted to the musical tones to be produced.

SUMMARY OF THE INVENTION

It is, therefore, a primary object of the present invention to solve the above described drawbacks with the conventional apparatus and to provide a novel type of apparatus and a method for imparting tone effects to the musical tones which are produced based on the music performance signals including tone effect control data, and a computer program for realizing such an apparatus and a method using a computer system, in which a music performance data string containing effect control data of some tone effects for a high-end model will play back on a low-priced model a music performance having tone effects similar to those on a high-end model with good compatibility.

According to the present invention, the object is accomplished by providing an apparatus for imparting tone effects to tone signals comprising: a music performance data signal receiving device which receives a music performance data signal containing tone effect control messages, each message including a tone effect selection code nominating a tone effect and a tone effect control parameter determining a property of the tone effect which tone effect with the property is available in a first rank of tone producing apparatus; a tone effect control message converting device which converts a particular tone effect selection code in the tone effect control message to another tone effect selection code than the particular one, in case the particular tone effect selection code nominates a tone effect which is not available in a second rank of tone producing apparatus, and converts a particular tone effect control parameter in the tone effect control message to another tone effect control parameter than the particular one, in case the particular tone effect control parameter is not adequate for the tone effect available in the second rank of tone producing apparatus; a tone effect conversion rule providing device which provides conversion rules for converting a tone effect selection code available in the first rank of tone producing apparatus but not available in the second rank of tone producing apparatus to a tone effect selection code nominating a tone effect of similar nature available in the second rank of tone producing apparatus, and for converting a tone effect control parameter for the first rank of tone producing apparatus to a tone effect control parameter usable in the second rank of tone producing apparatus; wherein the tone effect control message converting device converts the particular tone effect selection code and the tone effect control parameter with reference to the tone effect conversion table.

In an aspect of the present invention, the tone effect control message converting device converts both the tone effect selection code and the tone effect control parameter included in a same message among the tone effect control messages to designate a converted tone effect and to determine the property of the converted tone effect, in the cases where the tone effect selection code which nominates a tone effect not available in the second rank of tone producing apparatus and the tone effect control parameter is not adequate for the converted tone effect, the converted tone effect serving as a sub-surrogate tone effect to be available in the second rank of tone producing apparatus.

In another aspect of the present invention, the tone effect control message converting device converts only the tone effect selection code included in a message among the tone effect control messages to designate a converted tone effect and does not convert the tone effect control parameter included in the same message, in the cases where the tone effect selection code which nominates a tone effect not available in the second rank of tone producing apparatus and the tone effect control parameter is adequate for the converted tone effect, the converted tone effect serving as a surrogate tone effect to be available in the second rank of tone producing apparatus.

The tone effect conversion rules may include: a first rule that the same tone effect selection code and the same tone effect control parameter for the first rank of tone producing apparatus are to be used for the second rank of tone producing apparatus, in the case where the same tone effect is available in the second rank of tone producing apparatus;

a second rule that the tone effect selection code for the first rank of tone producing apparatus is to be converted to another tone effect selection code for the second rank of tone producing apparatus, in the case where the same tone effect is not available but a surrogate tone effect is available in the second rank of tone producing apparatus and the tone effect parameter is adequate for the surrogated tone effect; a third rule that the tone effect selection code for the first rank of tone producing apparatus is to be converted to another tone effect selection code for the second rank of tone producing apparatus and the tone effect control parameter for the first rank of tone producing apparatus is to be also converted to another tone effect control parameter which is adequate for the converted tone effect selection code, in the case where the same tone effect is not available but a surrogate tone effect is available in the second rank of tone producing apparatus and the tone effect parameter for the first rank of tone producing apparatus is not adequate as it is for the second rank of tone producing apparatus; and a fourth rule that the tone effect selection code is converted to mean no effect impartation, in the case where there is no surrogate effect available in the second rank of tone producing apparatus.

According to the present invention, the object is further accomplished by providing a method for imparting tone effects to tone signals comprising: a step of receiving a music performance data signal containing tone effect control messages, each message including a tone effect selection code nominating a tone effect and a tone effect control parameter determining a property of the tone effect which tone effect with the property is available in a first rank of tone producing apparatus; a step of converting a particular tone effect selection code in the tone effect control message to another tone effect selection code than the particular one, in case the particular tone effect selection code nominates a tone effect which is not available in a second rank of tone producing apparatus; a step of converting a particular tone effect control parameter in the tone effect control message to another tone effect control parameter than the particular one, in case the particular tone effect control parameter is not adequate for the tone effect available in the second rank of tone producing apparatus; a step of providing tone effect conversion rules for converting a tone effect selection code available in the first rank of tone producing apparatus but not available in the second rank of tone producing apparatus to a tone effect selection code nominating another tone effect of similar nature available in the second rank of tone producing apparatus, and for converting a tone effect control parameter for the first rank of tone producing apparatus to a tone effect control parameter usable in the second rank of tone producing apparatus; wherein the tone effect control message converting device converts the particular tone effect selection code and the tone effect control parameter with reference to the tone effect conversion rules According to the present invention, the object is still further accomplished by providing a computer program containing program instructions executable by a computer and causing the computer to execute: a process of receiving a music performance data signal containing tone effect control messages, each message including a tone effect selection code nominating a tone effect and a tone effect control parameter determining a property of the tone effect which tone effect with the property is available in a first rank of tone producing processing; a process of converting a particular tone effect selection code in the tone effect control message to another tone effect selection code than the particular one, in case the particular tone effect selection code nominates a tone effect which is not available in a second rank of tone producing processing; a process of converting a particular tone effect control parameter in the tone effect control message to another tone effect control parameter than the particular one, in case the particular tone effect control parameter is not adequate for the tone effect available in the second rank of tone producing processing; a process of providing tone effect conversion rules for converting a tone effect selection code available in the first rank of tone producing processing but not available in the second rank of tone producing processing to a tone effect selection code nominating another tone effect of similar nature available in the second rank of tone producing processing, and for converting a tone effect control parameter for the first rank of tone producing processing to a tone effect control parameter usable in the second rank of tone producing processing; wherein the process of converting the particular tone effect selection code and the tone effect control parameter with reference to the tone effect conversion rules.

As will be understood from the above description about the apparatus for imparting tone effects to tone signals, a sequence of the steps each performing the operational function of each of the structural elements of the above apparatuses will constitute a method for imparting tone effects to tone signals according to the spirit of the present invention.

As will be apparent from the description herein later, some of the structural element devices of the present invention are configured by a computer system performing the assigned functions according to the associated programs. They may of course be hardware structured discrete devices. Therefore, a hardware-structured device performing a certain function and a computer-configured arrangement performing the same function should be considered a same-named device or an equivalent to each other.

BRIEF DESCRIPTION OF THE DRAWINGS

For a better understanding of the present invention, and to show how the same may be practiced and will work, reference will now be made, by way of example, to the accompanying drawings, in which:

FIG. 1 is a list describing the tone effects assigned to the respective tone effect designating codes as included in a MIDI protocol for a high-end model of a musical apparatus and for an example model according to the present invention;

FIG. 2 is a block diagram illustrating the hardware configuration of a tone producing apparatus according to an embodiment of the present invention;

FIG. 3 is a list describing the assigned tone effects in more detail than FIG. 1 to include variation effects on a high-end model;

FIG. 4 is a list describing the assigned tone effects in like detail as FIG. 3 to show variation effects on a conventional low-priced model;

FIG. 5 is a list describing the assigned tone effects in like detail as FIG. 4 to show variation effects on a low-priced model according to the present invention;

FIG. 6 is a list describing the tone effect control parameters for the "AUTO WAH" effect;

FIG. 7 is a list describing the tone effect control parameters for the "AUTO WAH+DISTORTION" effect and the "AUTO WAH+OVERDRIVE" effect;

FIG. 8 is a list describing the tone effect control parameters for the "2WAY ROTARY SPEAKER" effect;

FIG. 9 is a list describing the tone effect control parameters for the "ROTARY SPEAKER" effect;

FIG. 10 is a list describing the tone effect control parameters for the "ROTARY SPEAKER" effect as a surrogate tone effect for the "2WAY ROTARY SPEAKER" effect;

FIG. 11*a* is a list describing the tone effect code conversion according to the present invention;

FIG. 11*b* is a list describing the tone effect category code conversion according to the present invention;

FIGS. 12*a* and 12*b* are, in combination, a flow chart describing an example of tone effect selection processing according to the present invention; and FIG. 13 is a flow chart describing an example of tone effect control parameter conversion processing according to the present invention.

DESCRIPTION OF THE PREFERRED EMBODIMENTS

Referring now to the accompanying drawings, a preferred embodiment of the present invention will be described in detail hereinbelow. It should, however, be understood that the illustrated embodiment is intended just for a practical example and not for limiting the scope of the present invention, and that various modifications may be made without departing from the spirit of the present invention.

1. Hardware Configuration

FIG. 2 is a block diagram illustrating the hardware configuration of a tone producing apparatus incorporating a tone effect imparting processor according to an embodiment of the present invention. The apparatus comprises a tone generator 1 which is connected to a bus 13 and generates musical tone signals according to the tone determining data included in music performance signals such as of the MIDI protocal supplied from the bus 13. The tone generator 1 has a plurality of tone generating channels for generating a plurality of musical tone signals concurrently. The generated tone signals are supplied to a mixer 2, which conducts signal mixing processing of the musical signals from the tone generator 1 and of the controlled musical signals from a digital signal processor (DSP) 3, and outputs the mixed signals to a digital-to-analog converter (DAC) 4, which in turn sends the converted analog signals to a sound system 5 including an amplifier, loudspeakers, etc. to emit audible musical sounds. The DSP 3 has a plurality of effect blocks (may be software blocks or hardware blocks), i.e. effect imparting algorithms, each of which is to impart an assigned tone effect to the tone signal supplied thereto according to the algorithm and the control parameters which can be set independently from each other effect blocks. The analog tone signals from the DAC 4 may be amplified and outputted therefrom directly in place of via the sound system 5. It is assumed herein that the mixer 2 and the DSP 3 constitute a tone effect imparting processor of a low-priced rank with functions of imparting limited types of tone effects to the tone signals generated by the tone generator 1.

The tone generator 1, the mixer 2 and the DSP 3 are connected to the bus 13, and are controlled by a CPU 10 which is also connected to the bus 13. To the bus 13 are further connected a communication input/output interface 6, a display device 7, manual controls 8, a timer 9, a flash ROM 11 and a RAM 12. The communication I/O interface 6 includes a MIDI interface, a USB interface, a network interface, and so forth and transmits MIDI signals therethrough. The display device 7 may be an LED panel, a liquid crystal panel or the like. The manual controls 8 may include ten-key pad switches, push-button switches, knob switches, etc. The timer 9 is to provide timing signals for the generation of musical tones. The CPU 10 executes various processing based on the control programs as stored in the flash ROM 11 to control the tone generator 1, the mixer 2, the DSP 3, etc. The flash ROM 11 is a ROM which is electrically erasable and programmable ROM and stores control programs, and can also temporarily store and erase parameters of temporary use. The RAM 12 is to temporarily store the data under processing as produced at the DSP 3 and the CPU 10, and functions as registers, flags, tables, etc.

The tone generator 1 may employ any type or fashion of tone signal generation method. Examples are a wave memory read-out type in which musical tone waveform sample value data are stored in a waveform memory and are read out successively by a progressing phase address signal whose progressing speed is given according to the tone pitch (frequency) of the musical tone signal to be generated, an FM tone synthesis type in which the tone waveform sample value data stored in a memory are read out by a progressing phase address signal whose progressing speed is periodically fluctuated, i.e. phase-modulated with a modulating signal to execute a frequency modulation algorithm, and an AM tone synthesis type in which the tone waveform sample value data stored in a memory are read out by a progressing phase address signal and with a periodically fluctuated level, which results in an amplitude modulation. Any other tone generation methods known in the art may be employed.

2. Preparatory Setting 2.1. Provision of Effect Code Conversion Table

As the effect control data are given to the DSP 3 in terms of the system exclusive message of the MIDI signal, an effect to be actually imparted to the tone signal through the DSP 3 is determined depending on the available tone effect algorithms equipped in the DSP according to the rank of the apparatus, namely, depending on the situations whether the nominated effect for a high-ranked model is available there, or a surrogate effect in the same effect category is available, or a surrogate effect in another effect category is available, or no such effect is available by the prepared algorithms in the DSP 3. In order to execute this processing by the CPU 10, there is prepared an effect code conversion table for converting effect numbers, i.e. effect selecting codes included in the effect control messages given by the music performance data signal.

FIG. 11*a* describes the tone effect code conversion table applicable for a low-priced model of apparatus according to the present invention. The table is stored in the flash ROM 11 as a look-up table in the apparatus. The look-up table contains effect variation codes (TYPELSB values) which respectively nominate codes for actually employed effects to conduct surrogate use of the effects where there are blanks in the effect assignment list of low-priced models and accordingly some surrogate uses are necessary. The code conversion table may be replaced by some code conversion algorithm or program, or any type of code conversion providing means which can convert nominated effect codes contained in the music performance data signal for a high-ranked model to the codes for the effects available in the DSP 3 of this embodiment of a low-ranked model.

For example, in FIG. 5, the frame at TYPEMSB=40H and TYPELSB=00H (fundamental effect) says "NO EFFECT OR THRU." Further, the frames TYPELSB=01H and TYPELSB=02H on the row of TYPEMSB=40H say "the same as in the fundamental frame." Accordingly, all the variation frames for TYPELSB=00H, 01H and 02H on the effect category of TYPEMSB=40H in the code conversion list are filled with the data "00H."

On the row of TYPEMSB=41H, the assigned effects at TYPELSB=00H, 01H and 02H are "CHORUS 1," "CHORUS 2" and "CHORUS 3," respectively, the same as on a high-end model shown in FIG. 3. The effect codes transmitted for use in a high-end model do not have to be converted for use in the shown example of a low-priced model, and the same processing as in a high-end model may take place in a low-priced model. On this category, therefore, the data (codes) stored in the frames of TYPELSB=00H, 01H and 02H are "00H," "01H" and "02H." Similarly in the category of TYPEMSB=42H, there is no need of converting the effect codes, and accordingly, the data stored in the frames of TYPELSB=00H, 01H and 02H are "00H," "01H" and "02H."

On the row of TYPEMSB=45H on a high-end model (FIG. 3), the assigned effects at TYPELSB=00H, 01H and 02H are "ROTARY SPEAKER," "DIST+ROTARY SPEAKER" and "OVERDRIVE+ROTARY SPEAKER," respectively, while on the low-priced model the "ROTARY SPEAKER" effect at the fundamental effect of TYPELSB=00H is surrogated for both the variations of TYPELSB=01H and 02H as shown in FIG. 4. Accordingly, in the effect code conversion table of FIG. 11*a*, all the TYPELSB frames of this category (TYPEMSB=45H) are filled with "00H." Similarly with respect to the categories TYPEMSB=49H and 4EH, all the TYPELSB frames are filled with "00H." These effects which are to substitute the nominated effects in the same category are referred to as "surrogate effects." In this sense, the "AUTO WAH" effect may be called a surrogate effect for the "AUTO WAH+DISTORTION" effect and the "AUTO WAH+OVERDRIVE" effect.

In the rough effect category of TYPEMSB=51H, however, the assigned effects at TYPELSB=00H, 01H and 02H are all "HARMONIC ENHANCER" on a high-end model, while they are all "NO EFFECT OR THRU" meaning "no effect is assigned" on a low-priced model. This means that no surrogate effects are available among variations on a low-priced model. In such a situation, the effect code conversion table of FIG. 11*a* describes "FFH" in all the TYPELSB frames. The notation "FFH" denotes "NO EFFECT OR THRU." This means no other effects are substitutable for the effect. On the row of TYPEMSB=53H and 57H of the effect code conversion table, all the frames of TYPELSB are filled with "FFH."

With respect to TYPEMSB=56H, on a high-end model, the assigned effects at TYPELSB=00H, 01H and 02H are "2WAY ROTARY SPEAKER," "DIST+2WAY ROTARY SPEAKER" and "OVERDRIVE+2WAY ROTARY SPEAKER," respectively. While on a conventional low-priced model (FIG. 4), the descriptions at TYPELSB=00H, 01H and 02H are all "NO EFFECT OR THRU," the "ROTARY SPEAKER" effect from another category of TYPEMSB=45H are substituted for this TYPEMSB=56H category. Such a substitute effect from another category to substitute a nominated effect in the nominated category (original effect included in the given music performance data signal) is herein referred to as a "sub-surrogate effect."

With respect to the sub-surrogate effects, the assigned TYPELSB frames are filled with a sign of "FEH" in the effect code conversion table of FIG. 11*a*. In the described embodiment of the present invention, there is also provided an effect category conversion table and stored in the flash ROM 11 to show the relations between the TYPEMSB of the nominated effects in the music performance data signals and the TYPEMSB of the respective sub-surrogate effects to substitute the nominated effects on a low-priced model. According to the category conversion table of FIG. 11*b*, the rough effect category TYPEMSB=45H for "ROTARY SPEAKER" is assigned to the rough effect category TYPEMSB=56H for "2WAY ROTARY SPEAKER as the sub-surrogate effects therefor.

Similarly, the "TOUCH WAH 1" effect category of TYPEMSB=52H is sub-surrogated by the "AUTO WAH" effect category of TYPEMSB=4EH, and the "DUAL ROTOR SPEAKER 1" effect category of TYPEMSB=63H is sub-surrogated by the "ROTARY SPEAKER" effect category of TYPEMSB=45H. For these categories the data "FEH" are stored at the TYPELSB frames to designate the sub-surrogate effects according to the effect category conversion table of FIG. 11*b*. The codes "FEH" and "FFH" will not be misinterpreted in the data processing, as neither of these are used to define particular variation effects.

In summary, the effects assigned at the TYPELSB=00H code (fundamental effect) on a high-end model and on an example model of the invention are listed in FIG. 1. The parenthesized code like "(4E)" and "(45)" in the column of the example model are the corresponding TYPEMSB codes for the high-end model to show origins of the surrogation. The relations are the same as shown in FIG. 11*b*.

2.2 Conversion of Effect Control Parameters

If incompatible parameters are applied for surrogate effects, unintended effects may be imparted to the musical tones. To solve such a disadvantage, a new parameter list is prepared in the invention by deleting from the existing parameter list such parameters which will deteriorate the compatibility among the effects in order to keep a good compatibility, for example, like a list shown in FIG. 10 where the "ROTARY SPEAKER" effect is applied as a sub-surrogate for the "2WAY ROTARY SPEAKER" effect, for example. The conversion rules for such parameter conversion are also prepared and stored in the flash ROM 11 just like the case of the effect code conversion table and the effect category conversion table.

More detailed explanation will now be made about a specific example of conversion rules which is applied in the case where the "ROTARY SPEAKER" effect is assigned as a sub-surrogate for the "2WAY ROTARY SPEAKER" effect, referring to FIGS. 8–10. The parameters of the parameter Nos. 6–9 are "EQ Low Frequency," "EQ Low Gain," "EQ High Frequency" and "EQ High Gain" for both the "2WAY ROTARY SPEAKER" effect category and the "ROTARY SPEAKER" effect category, and the parameters for the original effect are applicable for the converted effect without change. But, the parameters of the "Drive Low," the "Drive High," the "Low/High Balance," the "Crossover Frequency" and the "Mic L-R Angle" for the "2WAY ROTARY SPEAKER" effect (FIG. 8) are not common with the parameters for the "ROTARY SPEAKER" effect (FIG. 9), and are therefore deleted. As the parameter of "Rotor Speed" for the "2WAY ROTARY SPEAKER" effect (FIG. 8) are compatible with the parameter of "LFO Frequency" for the ROTARY SPEAKER" effect (FIG. 9), and therefore are used without change in the converted effect. Thus, a new parameter list for the sub-surrogate "ROTARY SPEAKER" effect is prepared as shown in FIG. 10. Similar parameter conversion rules are prepared also for the sub-surrogate "AUTO WAH" effect and the sub-surrogate "DISTORTION" effect, and are given reference numbers for the data processing.

3. General Operations of Apparatus

The MIDI signal transmitted via the communication I/O interface 6 includes system exclusive messages together with note-on data, note-off data, velocity data, pitch data, tone color number data. The tone generator 1 generates tone signals on a plurality of tone generation channels under the control by the CPU 10 according to these data signals.

When a note-on data signal is given included in the MIDI signal, a tone generation channel is captured in the tone generator, and the tone generation processing is started based on the pitch data, the tone color number data and the velocity data. When a note-off data signal given, the tone extinction processing takes place on the tone generation channel to release the channel after the assigned tone generation has been finished. On the other hand, when an exclusive message is given with respect to tone effect impartation, the designated tone effect is imparted on the tone signal according to the effect control code and the effect control parameter contained in the system exclusive message. The effect control code includes the effect number of the effect to be imparted and the block number of the DSP block (i.e. algorithm). More specifically, the tone signal generated by the tone generator 1 is transmitted through the mixer 2 and is supplied to the DSP 3, which imparts the designated effect to the supplied tone signal. Further, a plurality of output signals from the DSP 3 are inputted back to the mixer 2, and then inputted to the DAC 4 to be converted into analog tone signals, before being emitted as audible sounds from the sound system 5.

4. Processing of Message for Effect Control

Each time an effect control code and an effect control parameter are supplied in the form of a system exclusive message via the communication I/O interface 6, the CPU 10 converts the effect control code and the effect control parameter for a high-end model to an effect control code and an effect control parameter available in the designated DSP block (i.e. tone effect imparting algorithm) of the low-priced model of this example. The operations for imparting tone effects when such messages are given will be described in detail hereunder.

4.1. Effect Selection

Every time an effect control message is supplied, the process routine shown in FIGS. 12*a* and 12*b* in combination is invoked. The effect selection processing routine is started at a first step SP101 in FIG. 12*a*, substituting for a variable bn (block #) the block No. of the DSP 3 algorithm block to be used, and for a variable en (effect #) the effect No. as designated by the effect selection code included in the effect control message.

Thereafter in a step SP102, the effect code conversion table (FIG. 11*a*) stored in the flash ROM 11 is looked up to find whether the effect nominated by the effect No. (effect code) en itself is assigned in the table, or a surrogate effect is assigned instead, or a sub-surrogate effect is assigned instead, or no effect is assigned there. The subsequent processing varies depending upon this judgment, and therefore, explanation will be made separately hereunder.

<Where There Is the Nominated Effect>

Where the nominated effect is available, the TYPELSB value (code) of the effect No. en is found in the effect code conversion table, as the value equal to the value of the column header (00H, 01H or 02H) is written in the corresponding frame of the table. In this case, the process proceeds to a step SP103 in FIG. 12*b*. The step SP103 substitutes the nominated effect code en for a variable SEF(bn) which corresponds to the block No. bn, and then the process goes forward to a step SP104. The variable SEF(bn) is hereinafter referred to as a "selected effect." The step SP104 substitutes "00H" for a variable EPR(bn) which corresponds to the block No. bn. The variable EPR(bn) is hereinafter referred to as an "effect parameter conversion rule No." Among the rule Nos., the value "00H" means that no conversion of the parameter is necessary. Therefore, the same effect selection code as for the high-ranked model is set for the tone effect imparting processing. As the process moves forward to a step SP111, an algorithm and an initial parameter to realize the selected effect impartation as defined by the SEF(bn) value are set for the effect block bn of the DSP 3. After the process in the step SP111 is completed, the processing routine of FIGS. 12*a* and 12*b* comes to an end for the given tone effect control message.

<Where There Is a Surrogate Effect>

Where the nominated effect itself is not assigned in the effect code conversion table but there is a surrogate effect assigned instead, the TYPELSB values (codes) written in the frames under the columns of TYPELSB=01H and 02H are both "00H." In such a case, the process proceeds to a step SP105 in FIG. 12*b*, and the effect No. en of the surrogate effect is substituted for the selected effect SEF(bn) which corresponds to the block No. bn. As the process moves forward to a step SP106, a value "00H" is substituted for the effect parameter conversion rule No. EPR(bn) which corresponds to the block No. bn. This means that the fundamental effect is to be used as a surrogate without changing the respective parameters. As the process goes forward to the step SP111, an algorithm and an initial parameter to realize the selected effect impartation as defined by the SEF(bn) value are set for the effect block bn of the DSP 3. After the process in the step SP111 is completed, the processing routine of FIGS. 12*a* and 12*b* comes to an end for the given tone effect control message.

<Where There Is a Sub-surrogate Effect>

Where neither the nominated effect itself nor a surrogate effect is assigned in the effect code conversion table but there is a sub-surrogate effect assigned instead, the TYPELSB values (codes) written in the frames under the columns of TYPELSB=00H, 01H and 02H are all "FEH." In such a situation, the process proceeds to a step SP107 in FIG. 12*b*, and the effect No. en of the sub-surrogate effect is substituted for the selected effect SEF(bn) which corresponds to the block No. bn. For example, in the case where the "2WAY ROTARY SPEAKER" effect (56H) is nominated (to be on a high-end model), a TYPEMSB=45H is substituted for the selected effect code SEF(bn) meaning "ROTARY SPEAKER" effect as a sub-surrogate. As the process goes forward to a step SP108, the effect conversion rule No. which corresponds to the effect parameter conversion rule No. EPR(bn) is substituted for the EPR(bn) for the DSP block bn. As the process goes forward to the step SP111, an algorithm and an initial parameter to realize the selected effect impartation as defined by the SEF(bn) value are set for the effect block bn of the DSP 3. After the process in the step SP111 is completed, the processing routine of FIGS. 12*a* and 12*b* comes to an end for the given tone effect control message.

<Where There Is No Effect Available>

Where none of the nominated effect itself, a surrogate effect and a sub-surrogate effect is assigned in the effect code conversion table, the TYPELSB values (codes) written in the frames under the columns of TYPELSB=00H, 01H and 02H are all "FFH." In such a case, the process goes forward to a step SP109 in FIG. 12*b*, at which a value "00H" is substituted for the selected effect code SEF(bn) which corresponds to the block No. bn. Then, as the process moves forward to a step SP110, a value "FFH" is substituted for the effect parameter conversion rule No. EPR(bn) which corresponds to the block No. bn. The value "FFH" means that no effect is available and no effect needs to be imparted, and therefore, there is no need of changing the parameter value. As the process goes forward to the step SP111, an algorithm and an initial parameter to realize the selected effect impartation (i.e. no effect impartation) as defined by the SEF(bn) value are set for the effect block bn of the DSP 3 After the process in the step SP111 is completed, the processing routine of FIGS. 12*a* and 12*b* comes to an end.

4.2. Effect Control Parameter Conversion

After the above-described effect selection processing is over, the effect parameter message including an effect parameter No. and an effect parameter value is supplied and an effect control parameter conversion processing routine is invoked to convert the parameter No. and the parameter value according to the designated conversion rule in order to control the corresponding algorithm block in the DSP 3 for realizing an adequate tone effect. The parameter conversion processing will be described in detail hereunder with reference to FIG. 13.

As the parameter conversion processing is started, a step SP201 substitutes for the variable bn a block No. of the DSP 3 to be used, for the variable pn an effect control parameter No., and for the variable pv a parameter value for that parameter No. Then, a step SP202 judges whether the parameter conversion rule No. EPR(bn) is "FFH" or not. If EPR(bn)=FFH, the effect impartation processing need not be conducted, and the processing is terminated. If EPR(bn) is not "FFH," the processing continues to move forward to a step SP203. The step SP203 judges whether EPR(bn) is "00H" or not. If EPR(bn) is not "00H," the judgment at the step SP203 is affirmative (YES) and the process goes to a step SP204.

The step SP204 converts the parameter No. pn and the parameter value pv according to the parameter conversion rule as designated by EPR(bn) before the process proceeds to a step SP205. On the other hand, if EPR(bn)=00H, which means there are the nominated effect itself or a surrogate effect is existing and available, the judgment at the step SP203 is negative (NO) and the process goes directly to the step SP205.

The step SP205 determines a parameter value from the parameter No. pn for the selected effect SEF(bn) to be imparted. Depending on the nature of the parameter for the surrogate or sub-surrogate effect, the parameter value should be modified accordingly. Thereafter as the process proceeds to a step SP206, the respective DSP-driving-parameter value is set for the DSP block bn to be used for the tone effect impartation, before the processing routine is terminated.

As will be understood from the above description, a series of conversion processing (for the respective tone effect control messages) in the embodiment of the present invention enables surrogate uses of similar tone effects in other categories in a low-priced model in place of nominated effects for a high-end model in the given music performance data signal. Therefore, the music performance data string prepared for a high-end model may be played back on a low-priced model imparting as many and similar effects as possible to the produced musical tones. Thus, reproduceability of the music performance is very high.

Although the above description has been made with respect to a preferred embodiment of the present invention, the present invention should not be limited to such an embodiment, but can be practiced in various forms as follows. In the above embodiment, the CPU 10 equipped in the tone producing apparatus conducts the selection of the effect control codes and the conversion of the effect control parameters. A personal computer may be employed to input MIDI data, execute a program for selecting the effect control codes and converting the effect control parameters, and outputs the converted MIDI data to a conventional low-priced model of tone producing apparatus to play back the musical performance.

As will be understood from the above detailed description, the present invention provides an apparatus in which the tone effect selection codes and the tone effect control parameters for a high-ranked model of tone producing apparatus are converted to tone effect selection codes and tone effect control parameters available in a low-ranked model for imparting tone effects for a high-ranked model of tone producing apparatus to the tones to be produced in a low-ranked model of tone producing apparatus, and accordingly the apparatus can ensure the reproduceability of music performances even on low-priced tone producing apparatus.

While several forms of the invention have been shown and described, other forms will be apparent to those skilled in the art without departing from the spirit of the invention. Therefore, it will be understood that the embodiments shown in the drawings and described above are merely for illustrative purposes, and are not intended to limit the scope of the invention, which is defined by the appended claims.

What is claimed is:

1. An apparatus for imparting tone effects to tone signals comprising:

a tone signal providing device which provides tone signals;

a music performance data signal receiving device which receives a music performance data signal containing tone effect control messages including tone effect selection codes and/or tone effect parameter codes, each of said tone effect selection codes nominating a tone effect and each of said tone effect parameter codes determining a property of the corresponding tone effect where the tone effect with said property is available in a first rank of a tone producing apparatus;

a tone effect conversion rule providing device which provides tone effect conversion rules for converting a tone effect selection code nominating a tone effect, which is available in said first rank but not available in a second rank of a tone producing apparatus, to a tone effect selection code nominating a tone effect of similar nature, which is available in said second rank, and for converting a tone effect parameter code for said first rank to a tone effect parameter code which is usable in said second rank where the tone effect parameter code for said first rank is not compatibly usable in said second rank;

a tone effect control message converting device which converts a tone effect selection code contained in said received music performance data signal for said first rank to a tone effect selection code for said second rank where the tone effect selection code for said first rank is not available in said second rank, and converts a tone effect parameter code contained in said received music performance data signal for said first rank to a tone effect parameter code for said second rank, according to said tone effect conversion rules, said tone effect control message converting device not converting a tone effect selection code or a tone effect parameter code contained in said received music performance data signal for said first rank where the tone effect selection code for said first rank nominates a tone effect available in said second rank or the tone effect parameter code for said first rank is compatibly usable in said second rank, thereby outputting the converted and unconverted tone effect selection codes and tone effect parameter codes; and a tone effect imparting device which imparts to said tone signals the tone effects according to the tone effect selection codes and the tone effect parameter codes outputted from said tone effect control message converting device.

2. An apparatus for imparting tone effects to tone signals according to claim 1, wherein said tone effect control message converting device converts a received tone effect selection code to designate a converted tone effect and a received tone effect parameter code to determine the property of said converted tone effect, where the received tone effect selection code nominates a tone effect not available in said second rank and the received tone effect parameter code is not compatibly usable for said converted tone effect, said converted tone effect serving as a sub-surrogate tone effect to be available in said second rank.

3. An apparatus for imparting tone effects to tone signals according to claim 1, wherein said tone effect control message converting device converts only a received tone effect selection code to designate a converted tone effect and does not convert a received tone effect parameter code where the received tone effect selection code nominates a tone effect not available in said second rank and the received tone effect parameter code is compatibly usable for said converted tone effect, said converted tone effect serving as a surrogate tone effect to be available in said second rank of tone producing apparatus.

4. An apparatus for imparting tone effects to tone signals according to claim 1, wherein said tone effect conversion rules include:

a first rule that the same tone effect selection code and the same tone effect parameter code for the first rank are to be used, without conversion, for the second rank where the same tone effect is available in the second rank;

a second rule that the tone effect selection code for the first rank is to be converted to another tone effect selection code for the second rank where the same tone effect is not available but a surrogate tone effect is available in the second rank and the tone effect parameter code is compatible for said surrogate tone effect;

a third rule that the tone effect selection code for the first rank is to be converted to another tone effect selection code for the second rank and the tone effect parameter code for the first rank is to be also converted to another tone effect parameter code compatible for said converted tone effect selection code where the same tone effect is not available but a surrogate tone effect is available in the second rank and the tone effect parameter code for the first rank is not compatible for said surrogate tone effect; and a fourth rule that the tone effect selection code is converted to mean no effect impartation where there is no surrogate effect available in said second rank.

5. A method for imparting tone effects to tone signals comprising:

a step of providing tone signals;

a step of receiving a music performance data signal containing tone effect control messages including tone effect selection codes and/or tone effect parameter codes, each of said tone effect selection codes nominating a tone effect and each of said a tone effect parameter codes determining a property of the corresponding tone effect where the tone effect with said property is available in a first rank of tone producing processing;

a step of providing tone effect conversion rules for converting a tone effect selection code nominating a tone effect, which is available in said first rank but not available in a second rank of tone producing processing, to a tone effect selection code nominating another tone effect of similar nature, is available in said second rank, and for converting a tone effect parameter code for said first rank to a tone effect parameter code which is usable in said second rank where the tone effect parameter code for said first rank is not compatibly usable in said second rank;

a step of converting a tone effect selection code contained in said received music performance data signal for said first rank to a tone effect selection code for said second rank where the tone effect selection code of said first rank is not available in said second rank according to said tone effect conversion rules, thereby outputting the converted tone effect selection code;

a step of converting a tone effect parameter code contained in said received music performance data signal for said first rank to a tone effect parameter code for said second rank according to said tone effect conversion rules, thereby outputting the converted tone parameter code;

a step of maintaining a tone effect selection code contained in said received music performance data signal for said first rank where the tone effect selection code for said first rank nominates a tone effect available in said second rank, thereby outputting the unconverted tone effect selection code;

a step of maintaining a tone effect parameter code contained in said received music performance data signal for said first rank where the tone effect parameter code for said first rank is compatibly usable in said second rank, thereby outputting the unconverted tone effect parameter code; and a step of imparting to said tone signals the tone effect according to the tone effect selection code and the tone effect parameter code outputted in said steps of converting.

6. A method for imparting tone effects to tone signals according to claim 5, wherein said tone effect selection code converted in said step of converting a tone effect selection code and said tone effect parameter code converted in said step of converting a tone effect parameter code define a sub-surrogate tone effect to be available in said second rank where the tone effect selection code nominates a tone effect not available in said second rank and the tone effect parameter code is not compatibly usable in said second rank.

7. A method for imparting tone effects to tone signals according to claim 5, wherein the converted tone selection code in said step of converting a tone effect selection code and the unconverted tone effect parameter code in said step of maintaining a tone effect parameter code define a surrogate tone effect to be available in said second rank where the tone effect selection code nominates a tone effect not available in said second rank and the tone effect parameter code is compatibly usable in said second rank.

8. A computer program containing program instructions executable by a computer and causing said computer to execute:

a process of providing tone signals;

a process of receiving a music performance data signal containing tone effect control messages including tone effect selection codes and/or tone effect parameter codes, each of said tone effect selection codes nominating a tone effect and each of said a tone effect parameter codes determining a property of the corresponding tone effect where the tone effect with said property is available in a first rank of tone producing processing;

a process of providing tone effect conversion rules for converting a tone effect selection code nominating a tone effect, which is available in said first rank but not available in a second rank of tone producing processing, to a tone effect selection code nominating another tone effect of similar nature, which is available in said second rank, and for converting a tone effect parameter code for said first rank to a tone effect parameter code which is usable in said second rank where the tone effect parameter code for said first ran is not compatibly usable in said second rank;

a process of converting a tone effect selection code contained in said received music performance data signal for said first rank to a tone effect selection code for said second rank where the tone effect selection code of said first rank is not available in said second rank according to said tone effect conversion rules, thereby outputting the converted tone effect selection code;

a process of converting a tone effect parameter code contained in said received music performance data signal for said first rank to a tone effect parameter code for said second rank according to said tone effect conversion rules, thereby outputting the converted tone parameter code;

a process of maintaining a tone effect selection code contained in said received music performance data signal for said first rank where the tone effect selection code for said first rank nominates a tone effect available in said second rank, thereby outputting the unconverted tone effect selection code;

a process of maintaining a tone effect parameter code contained in said received music performance data signal for said first rank where the tone effect parameter code for said first rank is compatibly usable in said second rank, thereby outputting the unconverted tone effect parameter code; and a process of imparting to said tone signals the tone effect according to the tone effect selection code and the tone effect parameter code outputted in said processes of converting.

9. A computer program according to claim 8, wherein said tone effect selection code converted in said process of converting a tone effect selection code and said tone effect parameter code converted in said process of converting a tone effect parameter code define a sub-surrogate tone effect to be available in said second rank where the tone effect selection code nominates a tone effect not available in said second rank and the tone effect parameter code is not compatibly usable in said second rank.

10. A computer program according to claim 8, wherein the converted tone selection code in said process of converting a tone effect selection code and the unconverted tone effect parameter code in said process of maintaining a tone effect parameter code define a surrogate tone effect to be available in said second rank where the tone effect selection code nominates a tone effect not available in said second rank and the tone effect parameter code is compatibly usable in said second rank.

11. An apparatus for imparting a tone effect to an input tone signal comprising:

a receiving device which receives tone effect instruction signals including tone effect selection codes each of which nominates a tone effect from among a plurality of tone effects categorized into a sub-plurality of effect categories and tone effect parameter codes each of which controls a tone effect parameter wherein, between any two tone effects in each one of the effect categories, the tone effect parameters for the tone effects are compatible with each other;

a providing device which provides tone effect control data corresponding to a part of said plurality of tone effects available in the apparatus, wherein each of said tone effect control data controls signal processing of the tone effect corresponding to the tone effect control data;

a selecting device which selects one tone effect control data from among said tone effect control data provided by said providing device, responsive to said tone effect selection code received by said receiving device, wherein (a) when the providing device provides the tone effect control data nominated by the received tone effect selection code, said selecting device selects the tone effect control data of the nominated tone effect to be the nominated tone effect control data, (b) when the providing device does not provide the nominated tone effect control data, but does provide tone effect control data of the tone effect in a same category as the nominated tone effect, said selecting device selects the tone effect control data of the tone effect in the same category to be a surrogate tone effect control data, and (c) when the provided device provides no tone effect control data of the tone effect in the same category as the nominated tone effect, said selecting device selects the tone effect control data of the tone effect in a category different from the nominated tone effect to be a sub-surrogate tone effect control data;

a converting device which outputs said received tone effect parameter codes as they are, when the tone effect control data is selected to be said nominated tone effect control data or to be said surrogate tone effect control data by said selecting device, and outputs tone effect parameter codes obtained by converting said received tone effect parameter codes according to a predetermined rule, when the tone effect control data is selected to be said sub-surrogate tone effect control data by said selecting device; and a tone imparting device which imparts the tone effect to the input tone signal by executing said signal processing on the input tone signal based on said tone effect control data selected by said selecting device and said tone effect parameter code outputted from said converting device and outputs the effect imparted tone signal.

12. A tone effect imparting apparatus according to claim 11, wherein each of said tone effects is controlled by a number of parameters, and said tone effect parameter code includes parameter nominating data which nominates one of said number of parameters and value data which controls a value of said nominated parameter.

13. A tone effect imparting apparatus according to claim 11, wherein said tone effect control data includes a tone effect parameter to be controlled by said tone effect parameter code, wherein when said tone effect selection code is received and the tone effect control data is selected accordingly, the tone effect parameter included in said tone effect control data is used in said signal processing as an initial parameter, and thereafter when said tone effect parameter code is received, the tone effect parameter controlled by said tone effect parameter code is used in said signal processing.

14. A tone effect imparting apparatus according to claim 11, further comprising a memory device which stores a category conversion table indicating the relation between the nominated tone effects and said sub-surrogate tone effect control data, and wherein, when said providing device provides no tone effect control data of the tone effect in the same category as the nominated tone effect, said selecting device determines a different category from which the tone effect control data is selected to be said sub-surrogate tone effect control data based on said category conversion table.

15. A tone effect imparting apparatus according to claim 11, further comprising a memory device which stores conversion rule data, and wherein, when said selecting device selects the tone effect control data to be said sub-surrogate tone effect control data, the converting device converts said received tone effect parameter codes based on said conversion rule data.

16. A tone effect imparting apparatus according to claim 11, wherein when said providing device provides no tone effect control data of the tone effect in the same category as the nominated tone effect, said selecting device selects no effect control data and said tone effect imparting device imparts no effect to the input signal.

* * * * *